Figure 1:
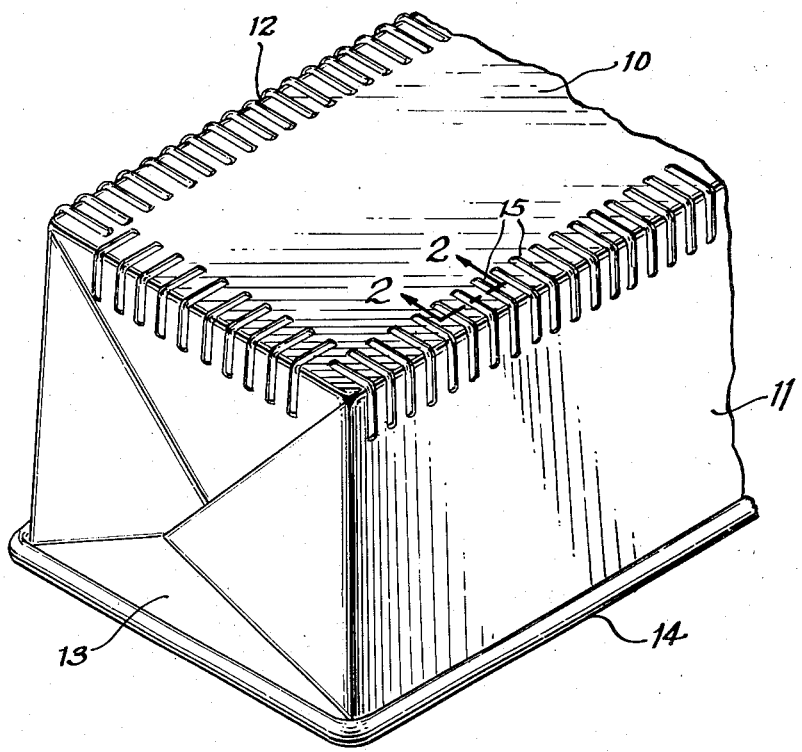

May 13, 1958   J. H. DEBS   2,834,505
BAKING PAN
Filed March 9, 1955

INVENTOR.
Jerome H. Debs
BY
Ooms, McDougall,
Williams & Hersh
Attorneys

United States Patent Office 2,834,505
Patented May 13, 1958

2,834,505

BAKING PAN

Jerome H. Debs, Chicago, Ill., assignor to Chicago Metallic Manufacturing Company, Chicago, Ill., a corporation of Illinois Application March 9, 1955, Serial No. 493,144

3 Claims. (Cl. 220—72)

This invention relates to a baking pan and it relates more particularly to a metallic pan formed of continuous side, bottom and end walls for baking loaves of bread and the like having a crust formed chiefly on the top side thereof.

Baking pans of the type described are used in commercial bakeries either as separate units or as units in which a plurality of pans are joined together for handling as an assembly during the baking operations. For use in baking bread or the like, such pans have been formed of tinplate or aluminum sheet stock of thin gauge into units of rectangular shape having considerable depth which is defined by a bottom wall and with side and end walls extending upwardly substantially perpendicularly continuously from the outer edges of the bottom wall.

A number of difficulties have been experienced in varying degree in the use of pan structures of the type described. To some extent, difficulties and irritations are experienced with reference to the release of baked goods from the pans. Not infrequently, the baked products tend to stick to the pan walls in the areas corresponding to the bottom edges of the pan as evidenced by the tearing of the baked goods in the lateral edge portions at the bottom wall when such products are forcibly removed from the pan. The cause for adhesion or sticking has not been fully determined, but it is believed that the surface relationship at the edges plus the presence of entrapped moisture leads to sticking or adhesion which continues to exist after the baking operations have been completed.

By way of further discussion, because of the location of the edges in the remote bottom portions of the pan, moisture in the bottom portion of the material being baked is incapable of finding its way upwardly to the top of the pan for escape into the atmosphere. As a result, such amounts of moisture become entrapped in the lower edge portions of the pan where they remain to cause undesirable blemishes in the baked product and also to impart non-uniformity in the texture and in the character of the baked goods.

In addition, such sheet metal fabrications have been found to be rather weak in the edge portions and to be incapable of resisting distortion under the conditions existing in normal use of the pan for baking bread and the like in commercial bakeries. Distortions and deformations which take place in the walls of the pan enable corresponding impressions to be formed in adjacent portions of the goods baked therein. Where the distortion and deformation from abuse and forces existing in normal use are excessive, the products baked therein become unacceptable for sale. This results in waste of material and the necessity to remove the pan from service.

From the standpoint of operation, such distortions introduce obstacles in the path of the product baked therein to prevent easy removal of the baked product in one piece from the pan. As a result, complications arise in the baking operations, an inferior product is produced, and ultimately the pan must be removed from service. These complications resulting from weakness of the pan in these particular areas lead to waste, lead to increase in the amount of labor required in the production of baked goods, and ultimately lead to loss of service of the pan in a relatively short time.

It is an object of this invention to produce and to provide a method for producing a sheet metal pan for use in the preparation of baked goods.

Another object is to produce a pan having deep sides of the type described in which the amount of sticking and adhesion of the baked product to the pan walls is greatly minimized, if not completely eliminated.

A further object is to produce a baking pan of the type described in which means are provided for assisting the escape of moisture otherwise entrapped between the baked goods and the walls of the baking pan.

A still further object is to produce a bread baking pan of the type described which embodies means in the construction of the meeting edges of the side walls and the bottom wall for militating against excessive distortions in the pan walls as an incidence to normal use, and to increase the useful life of the baking pan for the purpose for which it was intended.

It is an object of this invention to provide a baking pan of the type described which is simple in construction and which embodies various improvements for enhancing the use of the pan in its intended baking operations.

These and other objects and advantages of this invention will hereinafter appear and for purposes of illustration, but not of limitation, an embodiment of the invention is shown in the accompanying drawing, in which—

Figure 2:

Figure 1 is a perspective view taken from the bottom side of a baking pan embodying features of this invention; and Figure 2 is a sectional view taken along the line 2—2 of Figure 1.

As illustrated in the drawing, a baking pan embodying the features of this invention is formed of tinplate or aluminum sheet stock and the like folded to rectangular shape having a bottom wall 10, side walls 11 and 12, and end walls 13 extending upwardly substantially perpendicularly from the outer edges of the bottom wall. For purposes of reinforcement, appearance, and safety, a bead 14 is formed about a reinforcing wire extending continuously about the upper edges of the side and end walls.

In use for baking loves of bread or the like baked products the pan is formed with deep sides so that the loaf will have considerable height and be of rectangular shape. To facilitate removal of the baked goods from the pans, it is preferred to form the side and end walls with a slight taper extending outwardly from the bottom wall to the top.

Because of the depth of the pan, moisture present in the bottom portion of the goods being baked must find its way across the bottom wall and up the end or side walls for escape into the atmosphere. Where the corner portions between the bottom wall and the side and end walls are formed substantially perpendicularly, as before, the material being baked tends to become lodged in such corner portions and clings to the adjacent side, end and bottom walls in a manner to present a barrier to the free passage of the moisture vapor for escape from the pan. In addition, such sharp corner sections present a tortuous path over which the moisture vapor is incapable of traveling freely for escape, with the result that the moisture vapor tends to remain entrapped adjacent the bottom wall of the pan to cause distortions or other undesirable blemishes in the baked product and otherwise to modify the texture thereof.

The confining relationship which exists in the corner portions of pans heretofore employed apparently causes certain adhesions or sticking between the baked goods and the adjacent pan walls. Such adhesions result in the inability easily and quickly to remove the baked product from the pan and the tearing away of some of the baked product which sticks to the pan walls. It may be that the moisture vapor present in this area, as previously described, materially influences such adhesions. Whatever the reason, the amount of adhesion that is experienced is undesirable for successful commercial operations.

It has been found that these difficulties are substantially completely overcome when the corner portions of the meeting bottom and side walls and the meeting bottom and end walls of the pan are embossed to provide a plurality of laterally spaced-apart grooves 15 or corrugations extending from the edge portion of the bottom wall, about the adjacent corner, into a portion adjacent the edge of the connecting side and end walls. While the grooves or corrugations may be formed to considerable lengths, the desired improvements are secured when the lengths to which the grooves extend in each of the bottom, side and end walls are limited to less than 2 inches but more than ½ inch from the corner portions. As indicated in Figure 2 of the drawing, the corrugations are spaced apart a distance preferably substantially twice the width of the corrugations and the depth of the grooves forming the corrugations are best formed to correspond to the thickness of the metal walls forming the pan. It will be understood that the spaced relation between the corrugations or grooves and the depth of the grooves may be varied, but it is preferred to form the grooves and corrugations with a curvilinear contour with the ends tapering gradually into the side walls and the bottom wall or end walls of the pan.

It has been found that during the baking operation the material being baked draws away slightly in the direction away from the outwardly extending grooves or corrugations thereby to provide channels connecting an inner portion of the bottom wall with upwardly extending portions of the side and end walls through which the moisture vapor can be vented easily and quickly from the bottom side of the material being baked for more rapid and more complete escape into the atmosphere.

In addition to the channelling for release of moisture vapor in this critical area of the pan, the adhesions and sticking, previously experienced, appear concurrently to be eliminated or at least materially reduced, with the result that delivery of the baked products, free of injury, is greatly improved.

In addition to these important improvements in the baking operations and in the use of baking pans in commercial bakeries, the corrugations function greatly to strengthen the corner sections of the pan where most abuse is taken during normal use, and they further strengthen and stiffen the walls of the pan over their entirety, thereby to increase the useful life of the pan and prevent distortions which ordinarily require the removal of the pan from service.

It will be understood that changes may be made in the details of construction and in the materials of which the pan is formed without departing from the spirit of the invention, especially as defined in the following claims.

I claim:

1. In a baking pan having a flat, horizontally disposed bottom wall and deep side and end walls extending upwardly substantially perpendicularly from the outer edges of the bottom wall, and elongate grooves in closely spaced apart parallel relation in the inner walls of the pan extending continuously from the corner portions inwardly in the flat bottom wall of the pan for a distance short of the center and up the respective side and end walls for a distance short of the center and dimensioned to have a width narrow enough to resist entrance of dough therein during the baking operation thereby to provide continuous open channels in the interior of the pan extending along outer portions of the bottom wall, about the corners and up the lower portions of the side and end walls of the pan through which moisture vapors are able to escape during the baking operation.

2. A baking pan as claimed in claim 1 in which the embossments are spaced apart one from the other by a distance of about twice the width of the grooves formed by the embossments about the entire peripheral edge of the bottom wall.

3. A baking pan as claimed in claim 1 in which the grooves at the bottom and side walls are dimensioned to have a length within the range of ½ to 2 inches.

References Cited in the file of this patent

UNITED STATES PATENTS

| | | |
|---|---|---|
| 313,092 | Mayes | Mar. 3, 1885 |
| 476,340 | Wagandt | June 7, 1892 |
| 2,146,925 | Ahrbecker et al. | Feb. 14, 1939 |
| 2,349,751 | Piker | May 23, 1944 |
| 2,358,457 | Jackson | Sept. 19, 1944 |
| 2,673,003 | Stewart | Mar. 23, 1954 |

FOREIGN PATENTS

| | | |
|---|---|---|
| 671,933 | Great Britain | May 14, 1952 |